/ United States Patent (12) United States Patent
Larsson et al.

(10) Patent No.: US 8,396,503 B2
(45) Date of Patent: Mar. 12, 2013

(54) UPDATING A SIGNAL QUALITY TARGET FOR UPLINK POWER CONTROL IN A RADIO COMMUNICATION SYSTEM RESPONSIVE TO ESTIMATED REQUIRED SIGNAL QUALITY FOR CHANGING TRANSMISSION FORMATS

(75) Inventors: Kjell Larsson, Lulea (SE); Peter Okvist, Lulea (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 470 days.

(21) Appl. No.: 12/679,622

(22) PCT Filed: Oct. 19, 2007

(86) PCT No.: PCT/SE2007/050756
§ 371 (c)(1),
(2), (4) Date: Mar. 23, 2010

(87) PCT Pub. No.: WO2009/051532
PCT Pub. Date: Apr. 23, 2009

(65) Prior Publication Data
US 2010/0197337 A1   Aug. 5, 2010

(51) Int. Cl.
*H04W 52/24* (2009.01)
*H04W 52/26* (2009.01)
(52) U.S. Cl. .................... 455/522; 455/69; 455/67.11
(58) Field of Classification Search .............. None
See application file for complete search history.

(56) References Cited

U.S. PATENT DOCUMENTS

| 2003/0083088 | A1 | 5/2003 | Chang et al. | |
|---|---|---|---|---|
| 2004/0101071 | A1* | 5/2004 | Naito | 375/340 |
| 2005/0099968 | A1 | 5/2005 | Yamano | |
| 2005/0220047 | A1* | 10/2005 | Baey et al. | 370/315 |
| 2007/0060189 | A1 | 3/2007 | Vallette et al. | |
| 2009/0073927 | A1* | 3/2009 | Ishii et al. | 370/329 |

FOREIGN PATENT DOCUMENTS

| EP | 1 517 456 A1 | 3/2005 |
|---|---|---|
| WO | WO 01/52425 A2 | 7/2001 |

OTHER PUBLICATIONS

International Search Report dated Nov. 26, 2008 (7 pages).
Written Opinion dated Nov. 11, 2008 (9 pages).
International Preliminary Report on Patentability dated Feb. 3, 2010 (10 pages).
Second Written Opinion dated Oct. 22, 2009 (10 pages).

* cited by examiner

*Primary Examiner* — Philip Sobutka
(74) *Attorney, Agent, or Firm* — Myers Bigel Sibley & Sajovec, P.A.

(57) ABSTRACT

A method, an apparatus and a computer program for updating a signal quality target for power control of an ongoing radio transmission in a radio communication system. A change in transmission format from a first transmission format to a second transmission format is detected (301) for the radio transmission. The signal quality target is updated (302) to include a target offset component associated with the detected change in transmission format.

19 Claims, 3 Drawing Sheets

UPDATING A SIGNAL QUALITY TARGET FOR UPLINK POWER CONTROL IN A RADIO COMMUNICATION SYSTEM RESPONSIVE TO ESTIMATED REQUIRED SIGNAL QUALITY FOR CHANGING TRANSMISSION FORMATS

TECHNICAL FIELD

The present invention relates to method and arrangements in a radio communication system. The invention more in particular relates to power control of radio transmissions in the radio communication system.

BACKGROUND

In cellular radio communication systems radio transmission are typically subject to power control. Thus in e.g. cellular radio communication systems conforming to the $3^{rd}$ Generation Partnership Project (3GPP) Universal Mobile Telecommunications (UMTS) specifications, power control of radio transmissions are performed utilizing both inner and outer-loop power control functions.

The inner-loop power control (ILPC) adjusts the transmit power of a sending entity towards a specific signal quality target, e.g. signal-to-interference ratio (SIR) target, at a receiving entity, whereas the outer-loop power control (OLPC) adjusts the signal quality target of the inner loop power control in order to maintain a specified communication quality-based target (e.g. Block Error Rate (BLER) or number of transmission attempts). In the uplink direction, i.e. from mobile station to base station, OLPC is used both in connection with DCH (Dedicated Channel) and E-DCH (Enhanced Data Channel) transport channels, but typically in a slightly different manner. Due to the use of HARQ (Hybrid Automatic Repeat Request) protocol in EUL (Enhanced Uplink), i.e. when communicating using an E-DCH transport channel, the OLPC quality target is typically the number of transmission attempts while for communications using a DCH transport channel, the OLPC quality target is typically Block Error Rate (BLER).

The transmission format, the so called E-DCH Transport Format Combination (E-TFC), used in each Transmission Time Interval (TTI) can be varied between TTIs so as to adapt the amount of data transmitted to the currently available resources and/or the amount of data available for transmission.

SUMMARY

An object of the present invention is enabling improved power control of radio transmissions in a radio communication system.

In one aspect, the present invention is a method of updating a signal quality target for power control of an ongoing radio transmission in a radio communication system. The method includes detecting a change in transmission format from a first transmission format to a second transmission format for the radio transmission. The signal quality target is then updated to include a target offset component associated with the detected change in transmission format.

In another aspect, the present invention is an apparatus adapted to update a signal quality target for power control of a radio transmission in a radio communication system. The apparatus includes means for detecting a change in transmission format from a first transmission format to a second transmission format for the radio transmission. The apparatus further includes means for updating the signal quality target to include a signal quality target offset component associated with the detected change in transmission format.

In yet another aspect, the present invention is a computer program embodied on a computer-readable medium and executable by digital data processing circuitry to perform the method recited above.

An advantage afforded by the invention is that it enables improved power control of radio transmissions.

The invention will now be described in more detail with reference to exemplary embodiments thereof and also with reference to the accompanying drawings.

DETAILED DESCRIPTION

Figure 1:
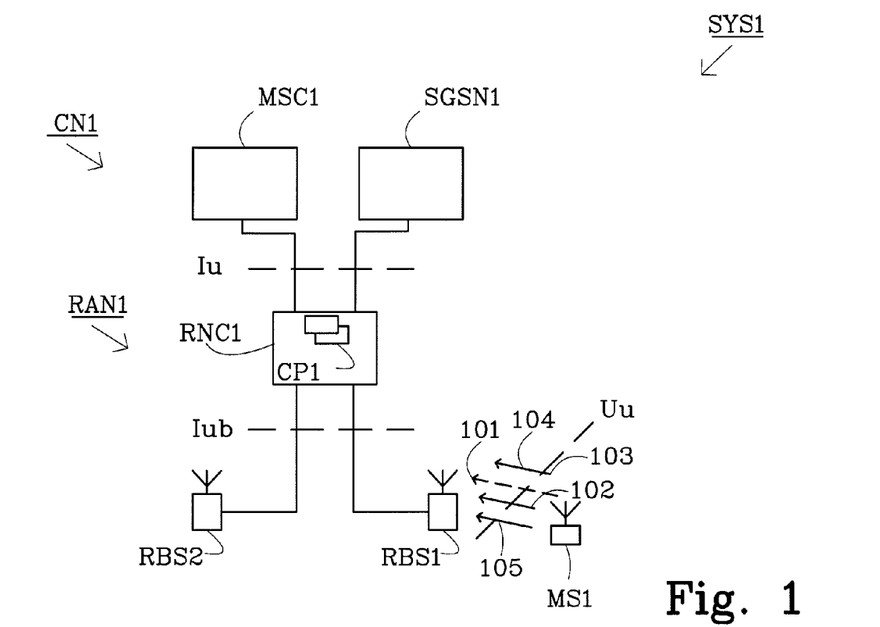
FIG. 1 is a schematic view of a non-limiting example of a radio communication system in which the present invention may be implemented.

FIG. 1 illustrates a non-limiting example of a communication system SYS1 in which the present invention may be employed. The exemplary communication system SYS1 illustrated in FIG. 1 is a Universal Mobile Telecommunication System (UMTS). The communication system SYS1 includes a core network CN1, a UMTS Terrestrial Radio Access Network (UTRAN) RAN1 and User Equipment (UE), alternatively referred to as mobile stations (MS).

The core network CN1 includes a Mobile services Switching Center (MSC) node MSC1 that provides circuit-switched services and a General Packet Radio Service (GPRS) node SGSN1, sometimes referred to as a Serving GPRS Support node (SGSN), which is tailored to provide packet-switched type services.

Each of the core network nodes MSC1 and SGSN1 connects to the the radio access network RAN1 over a radio access network interface referred to as the mu interface. The radio access network RAN1 includes one or more radio network controllers (RNCs). For sake of simplicity, the radio access network RAN1 of FIG. 1 is shown with only one radio network controller node RNC1. Each radio network controller is connected to and controls a plurality of radio base stations (RBSs). For example, and again for sake of simplicity, FIG. 1 only illustrates a first radio base station node RBS1 and a second radio base station node RBS2 connected to the radio network controller node RNC1. The interface between the radio network controller RNC1 and the base stations RBS1 and RBS2 is referred to as the Iub interface. Mobile stations, such as mobile station MS1 shown in FIG. 1, communicate with one or more radio base stations RBS1-RBS2 over a radio or air interface referred to as the Uu interface.

Each of the radio interface Uu, the Iu interface and the Iub interface are shown by dashed lines in FIG. 1

Figure 2:
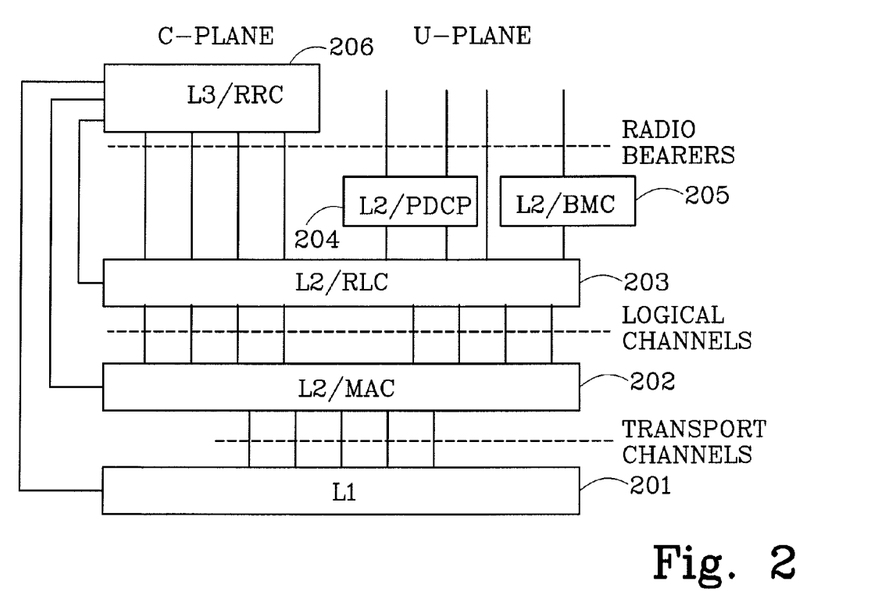
FIG. 2 is a block diagram providing a simplified illustration of the radio interface architecture of the communication system in FIG. 1.

FIG. 2 is a simplified illustration of the radio interface architecture of the UMTS system illustrated in FIG. 1.

The radio interface is layered into three protocol layers:
the physical layer, also referred to as Layer 1 (L1)
the data link layer, also referred to as Layer 2(L2)
the network layer, also referred to as Layer 3(L3).

Layer 2 is split into a number of sublayers including Medium Access Control (MAC) 202, Radio Link Control (RLC) 203, Packet Data Convergence Protocol (PDCP) 204 and Broadcast/Multicast Control (BMC) 205.

Layer 3 and the RLC-sublayer are further divided into a Control-plane (C-plane) and a User-plane (U-plane) while the PDCP- and BMC-sublayers exist in the U-Plane only. The U-plane protocols implements so called radio access bearer services, i.e. services for carrying user data (e.g. speech, data or multimedia) between mobile stations and the core network. The C-plane provides a Radio Resource Control (RRC) protocol for controlling the radio access bearers and the connection between mobile stations and the network from different aspects.

The physical layer 201 offers information transfer services to the MAC-layer and higher layers. The physical layer transport services are described by how and with what characteristics data are transferred over the radio interface. These services are denoted Transport Channels. The physical layer 201 is responsible for mapping the transport channels onto physical channels of the radio interface Uu. The physical layer 201 performs functions including FEC encoding/decoding and interleaving/deinterleaving of transport channels, multi-plexing/demultiplexing of transport channels, rate matching, modulation/demodulation and spreading/despreading of physical channels, closed-loop power control and RF-processing.

The MAC-sublayer 202 provides data transfer services on logical channels. A set of logical channel types is defined for different kinds of data transfer services offered by the MAC-sublayer. Each logical channel type is defined by what type of information is transferred. The MAC-sublayer 202 performs functions including mapping between logical channels and transport channels, selection of appropriate transport format for each transport channel depending on instantaneous source rate, transport channel type switching and ciphering.

The RLC-sublayer 203 provides different data transfer services to higher layers including transparent, unacknowledged and acknowledged data transfer. The RLC-sublayer 203 performs functions including segmentation and reassembly of higher layer protocol data units, concatenation, ciphering, error correction and flow control.

The PDCP-sublayer 204 provides transfer of user data and header compression/decompression.

The BMC-sublayer 205 provides a broadcast/multicast transmission service in the user plane for common user data in unacknowledged mode.

The UMTS system illustrated in FIG. 1 supports the new transport channel Enhanced Dedicated Channel (E-DCH) in the uplink direction (i.e. for transmissions from mobile stations such as mobile station MS1 to the radio access network RAN1) which was introduced in 3GPP Release 6. This Enhanced uplink, also known as HSUPA (High Speed Uplink Packet), provides higher throughput, reduced latency and increased capacity.

There is at most one E-DCH transport channel per E-DCH capable mobile station e.g. mobile station MS1 and the E-DCH transport channel is mapped onto a set (one or more) of E-DCH Dedicated Physical Data Channels (E-DPDCHs). Each E-DCH transport channel is further supported by a E-DCH Dedicated Physical Control Channel (E-DPCCH) providing information in the uplink direction to the network for enabling a radio base station e.g. the first radio base station RBS1 to demodulate and decode the data transmission. FIG. 1 schematically illustrates an example scenario of an E-DCH transport channel 101 established for uplink transmissions from the mobile station MS1 to the first radio base station RBS1. The E-DCH transport channel 101 is mapped onto an E-DPDCH channel 102 and supported by an E-DPCCH channel 103.

The transmission format, the so called E-DCH Transport Format Combination (E-TFC) used in each Time Transmission Interval (TTI) can be varied between TTIs so as to adapt the amount of data transmitted to the currently available resources and/or the amount of data available for transmission. In each TTI, at most one transport block of dynamic size is transmitted on an E-DCH transport channel. The E-DCH Transport Format Combination of a TTI defines the size of the transport block but also implicitly a lot of other aspects of the transmission format of the E-DCH transport channel in the TTI such as e.g. the number of E-DPDCHs and their spreading factors, amount of padding/truncation etc.

The set of possible E-DCH Transport Format Combinations are predefined in the 3GPP specifications and are provided in the 3GPP TS 25.321 specifications (release 6) as four different tables. For each of the two TTIs specified (2 ms and 10 ms), there is one table optimized for common RLC Protocol Data Unit sizes and one general table with constant maximum relative overhead. Which table to use is defined by the applicable TTI and Radio Resource Control signaling between the network and a mobile station.

When data transmissions are ongoing on the E-DCH Transport Channel 101, the E-DCH Transport Format Combination used in the current TTI is indicated from the mobile station MS1 to the first base station RBS1 as an E-DCH Transport Format Indicator (E-TFCI) (schematically indicated as 104 in FIG. 1). The E-TFCI indicates which entry in the applicable E-Transport Format Combination table that defines the current E-Transport Format Combination. Thus, based on the E-TFCI value the first radio base station RBS1 receives for a TTI, it knows how to demodulate and decode the E-DCH data transmission from the mobile station MS1 in that TTI.

The E-DCH power control works in a similar manner as for the so called Dedicated (DCH) transport channel.

The E-DPDCH transmission power is defined relative to the uplink Dedicated Physical Control Channel (DPCCH) (schematically illustrated as 105 in FIG. 1). Each E-DCH Transport Format Combination has an associated E-DPDCH-to-DPCCH gain factor $\beta_{ed}$ defining the relationship between the E-DPDCH and uplink DPCCH transmission powers. The mobile station MS1 is informed of the gain factors associated with the respective E-DCH Transport Format Combination via reference gain factors $\beta_{ed,ref}$ associated with respective reference E-DCH Transport Format Combinations and signaled from the radio access network RAN1. Typically, the number of reference E-DCH Transport Format Combinations/reference gain factors $\beta_{ed,ref}$ pairs are much less (e.g. less than 10) than the total number of E-DCH Transport Format Combinations (up to 128) the mobile station MS1 may use. For other E-DCH Transport Format Combinations the mobile station MS1 derives gain factors by interpolating from the signaled reference gain factors provided.

The E-DCH power control further utilizes both an inner loop power control (ILPC) function and an outer loop power control (OLPC) function.

For the example scenario of FIG. 1 wherein the E-DCH Transport Channel 101 has been established between the mobile station MS1 and the first radio base station RBS1, power control would typically be performed as follows.

The first radio base station RBS1 performs inner loop power control by estimating a received Signal-to-Interference ratio (SIR) of the Dedicated Physical Control Channel 105 and comparing it to a signal quality target value in the form of a target SIR. Based on the result, the first radio base station RBS1 issues transmit power control (TPC) commands to the mobile station MS1 ordering it to increase or decrease its transmission power depending on whether the estimated SIR was below or above the target SIR.

The target SIR is provided by the outer loop power control function performed by the radio network controller RNC1. Communication quality, for E-DCH transport channels typically defined as a certain targeted number of transmission attempts in an Hybrid ARQ (HARQ) process associated with the E-DCH transport channel, is evaluated. If the communication quality is too low, i.e. the number of transmission attempts are above the set target, the target SIR is increased while if the communication quality is too high, i.e. the number of transmission attempts are below the set target, the target SIR is decreased. Changes in the target SIR is communicated from the radio network controller to the first radio base station RBS1.

The target SIR may e.g. be established for each successfully received so called MAC-es Protocol Data Unit (PDU) as $$SIR_{target}(k+1) = SIR_{target}(k) + (N_{ERR} - TTE_{target}) * SIR_{step} / (1 - TTE_{target}) \quad (1)$$

where $SIR_{target}$ is the current SIR target;

k is an index representing time;

$SIR_{step}$ represents the step size when increasing the $SIR_{target}$ e.g. 0.5-1 dB.

$TTE_{target}$ is the wanted Transmission Attempts (TA) target error rate characterizing the quality requirement the OLPC function strives to fulfill.

$N_{err}$ is equal to one if too many Transmission Attempts were required in order to decode the block, and zero otherwise.

The inventors of the present invention have recognized that as a result of using relatively few reference E-DCH Transport Format Combinations/reference gain factors $\beta_{ed,ref}$ pairs (as compared to the total number of E-DCH Transport Format Combinations), at least some of the remaining E-DCH Transport Formats will get suboptimal gain factors. These suboptimal gain factors causes different E-DCH Transport Format Combinations to require different SIR target values to fulfill the targeted communication quality (e.g. number of transmission attempts).

The spread in different required SIR targets due to suboptimal gain factors can be several dB and exhibits a "wrap around pattern" according to which for increasing E-TFCI values, i.e. for E-DCH Transport Format Combinations associated with increasing transport block sizes, the required SIR target values often increases between two neighboring E-DCH Transport Format Combinations but sometimes also decreases significantly.

As a consequence of these suboptimal gain factors, the OLPC function need not only compensate for the effect of a changing radio environment (which results in varying SIR-target), but also different required SIR-targets for different E-DCH Transport Format.

Since the OLPC is a rather slow control mechanism, it takes time for the OLPC to find the right SIR-target when there is a change in transmission format from a first E-DCH Transport Format Combination to a second E-DCH Transport Format Combination requiring a different SIR-target than the first E-DCH Transport Format Combination. During this time unnecessary retransmissions that costs user throughput might occur since the signal quality is not good enough or alternatively, the signal quality is too high causing unnecessary interference and hence wasting system capacity.

In unfavorable cases, an E-DCH Transport Format Combination providing smaller transport blocks (i.e. less number of bits in each transport block/TTI) that requires significantly higher SIR-target than the normally used E-DCH Transport Format Combination might be selected now and again for short periods of time. Since this E-DCH Transport Format, despite the lower number of bits in each transport block, requires a higher SIR target, it is likely that a transmission target error occur which triggers an OLPC up-step to increase the SIR-target when changing to this E-DCH Transport Format Combination from the normally used E-DCH Transport Format Combination. If the transmission format then shortly there after is changed back to the normal E-DCH Transport Format Combination, it still takes a rather long time for the OLPC to reduce the target SIR back down to the level appropriate for the normally used E-DCH Transport Format Combination and during this time, the SIR target level used is too high and thus system capacity is wasted.

The repeated use of the E-DCH Transport Format Combination requiring a higher SIR target for short periods of time may in worst case scenarios, result in too high SIR-target being applied for most of the duration of a communication session.

Figure 3:
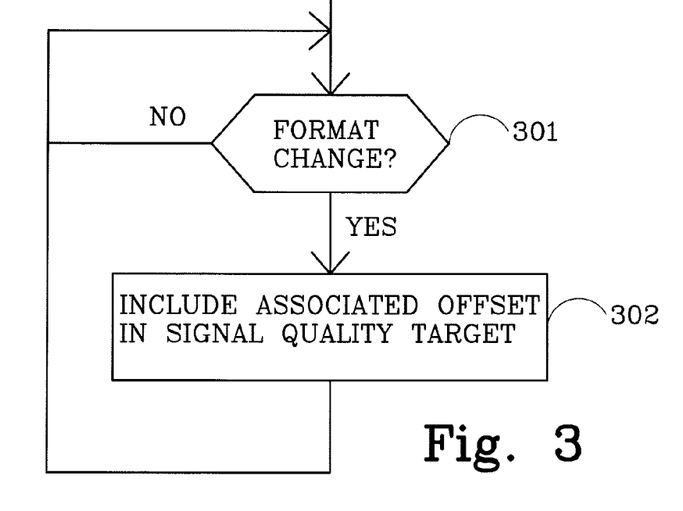
FIG. 3 is a flow diagram illustrating a first exemplary embodiment of a method according to the invention.
Figure 4:
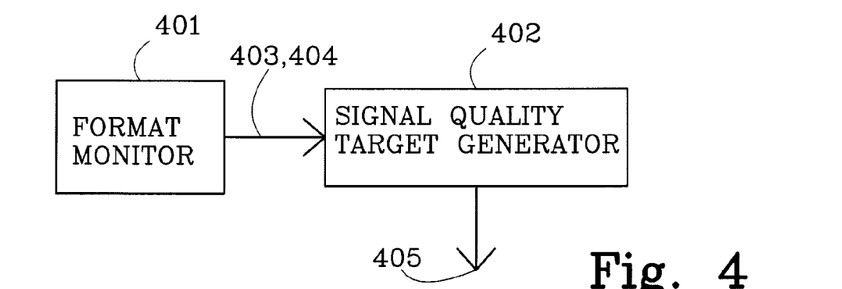
FIG. 4 is a block diagram illustrating a first exemplary embodiment of an apparatus according to the invention.

A first exemplary embodiment of the invention for use in the context of the radio communication system SYS1 of FIG. 1 and addressing the situation elaborated above is illustrated in FIG. 3 together with FIG. 4.

FIG. 4 schematically illustrates a format monitor functional unit 401 connected to a signal quality target generator functional unit 402 representing a first exemplary embodiment of an apparatus according to the invention implemented in the radio network controller RNC1.

FIG. 3 illustrates a first exemplary method according to the invention for updating a signal quality target for power control of an on going radio transmission.

At step 301, a check is made whether the transmission format of an on going 3GPP Enhanced Uplink transmission has changed. This step is performed by the format monitor 401 illustrated in FIG. 4 based on E-TFCI values received by the radio network controller RNC1 from radio base stations involved in ongoing Enhanced Uplink transmissions. Thus, for the scenario illustrated FIG. 1 where the E-DCH transport channel 101 has been established between the mobile station MS1 and the first radio base station RBS1, the first radio base station RBS1 decodes E-TFCI values transmitted on the E-DPCCH channel 103 and reports the decoded E-TFCI values to the radio network controller RNC1 using the Iub user plane protocol for DCH data streams. In this exemplary embodiment of the invention, the UL DATA FRAME signals conveying E-DCH transport blocks over the Iub interface are modified to include also E-TFCI values. Alternatively, the radio network controller RNC1 could derive the E-TFC/E-TFCI used by matching the size of a received MAC-es PDU to the set of possible E-DCH Transmission Format Combinations available for the established E-DCH transport channel 101. This latter alternative would not require any modifications of the Iub user plane protocol.

If a newly received E-TFCI value matches the previously received E-TFCI value (an alternative NO at step 301), the format monitor 401 just waits for the next E-TFCI value to repeat step 301.

If the newly received E-TFCI value differs from the previously received E-TFCI value (an alternative YES at step 301), the format monitor 401 informs the signal quality target generator 402 that there has been a change in transmission format, from a first transmission format associated with the old (or first) E-TFCI value to a second transmission format associated with the new (or second) E-TFCI value, and provides both the old and new E-TFCI values (schematically illustrated as 403 and 404 in FIG. 4) to the signal quality target generator 402. The format monitor 401 also registers the new E-TFCI value 404 as the most recently received E-TFCI value.

At step 302, the signal quality target generator 402 updates a signal quality target 405 for power control of the concerned Enhanced Uplink transmission to include a target offset component associated with the detected transmission format change.

In this exemplary embodiment, the signal quality target generator 402 derives the target offset component by retrieving estimated required SIR values associated with the new and previous E-TFCI values respectively. The target offset component is determined as the difference between the estimated required SIR value associated with the new E-TFCI value and the estimated required SIR value associated with the previous E-TFCI value.

Figure 5:
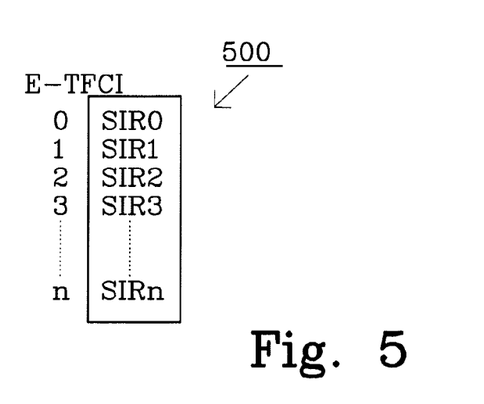
FIG. 5 is a block diagram illustrating an exemplary data structure representing a table of required SIR values for different E-TFCs.

The estimated required SIR values are stored in a data structure representing a table 500 schematically illustrated in FIG. 5. The table includes estimated required SIR values SIR0-SIRn associated with respective E-TFCI values 0-n. Thus for each E-TFCI value (e.g. 1) there is an associated estimated required SIR value (e.g. SIR1) indicating the SIR value which is believed to be required to maintain appropriate communication quality when using the E-DCH transport format combination associated with said E-TFCI value. The estimated required SIR values can be determined by analytical or numerical methods, such as system-and link layer simulations, or by having the system gather statistics on what SIR different E-DCH Transport Format Combinations actually require. Gathering statistics on what SIR different E-DCH Transport Format Combinations require may e.g. be performed by forcing absolute grant (or similar bit rate/resource limiting unit) to cause a certain E-DCH Transport Format Combination to be used for a period of time long enough to enable the target SIR from the outer loop power control function to reach a stable/steady-state value (i.e. where the impact on the target SIR from transmission using other E-DCH Transport Format Combinations is negligible) and then collecting target SIR statistics associated with the E-DCH Transport Format Combination after reaching the steady state. From the gathered statistics, the estimated required SIR for an E-DCH Transport Format Combination can be derived e.g. as a mean value.

The signal quality target generator 402 generates the signal quality target 405 according to equation (2) below $$SIR_{target}(k+1) = SIR_{target}(k) + D_{E\text{-}TFC\text{-}change} \quad (2)$$

where $SIR_{target}(k+1)$ is the new signal quality target;

$SIR_{target}(k)$ is the previous signal quality target; and $D_{E\text{-}TFC\text{-}change}$ is the target offset associated with the detected change in transmission format.

Typically updates of the $SIR_{target}$ according to equation (1), which is triggered by successfully received MAC-es PDUs, and updates of the $SIR_{target}$ according to equation (2), which is triggered by detected transmission format changes, occur at different points in time. In this exemplary embodiment, the signal quality target generator 402 performs both types of updates, but it is of course possible to have different units performing updates according to equation (1) and equation (2) respectively.

The updated signal quality target, i.e. $SIR_{target}(k+1)$, generated either by equation (1) or equation (2) are communicated to all radio base stations involved in the ongoing Enhanced Uplink communication, e.g. the first radio base station RBS1 for the example scenario illustrated in FIG. 1.

In the first exemplary embodiments of the invention, the processing steps 301-302 illustrated in FIG. 3 and the functional units 401 and 402 are implemented using digital data processing circuitry in the form of one or more conventional programmable processors CP1 in the radio network controller node RNC1.

Apart from the exemplary first embodiment of the invention disclosed above, there are several ways of providing rearrangements, modifications and substitutions of the above disclosed embodiment resulting in additional embodiments of the invention.

Figure 6:
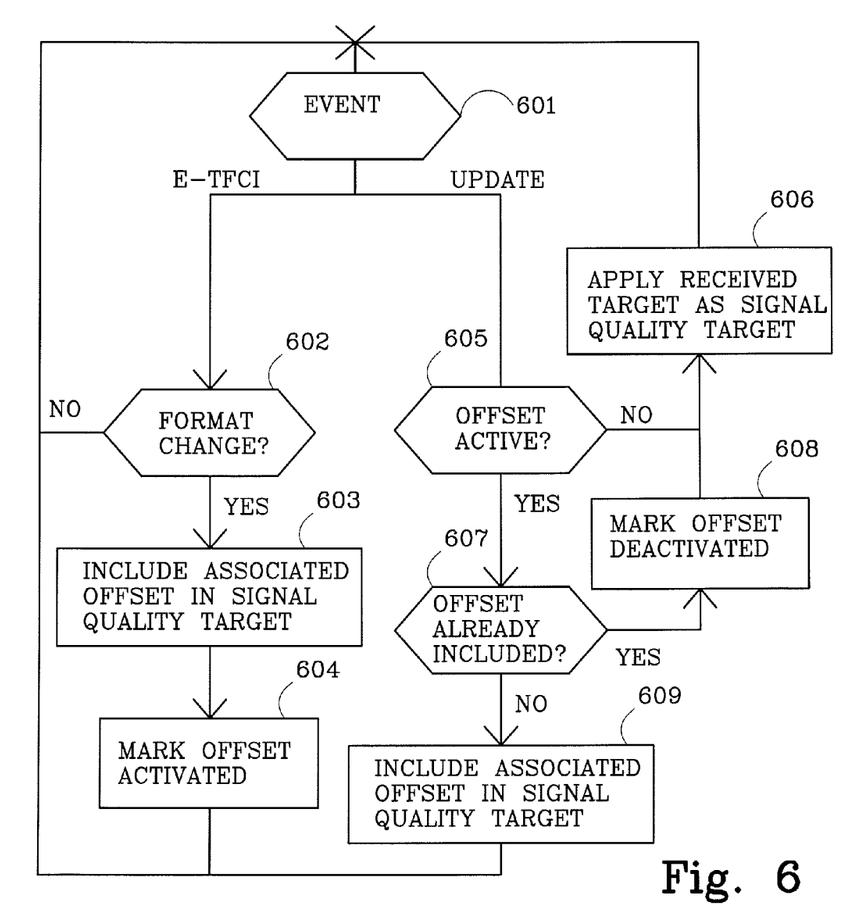
FIG. 6 is a flow diagram illustrating a second exemplary embodiment of a method according to the invention.
Figure 7:
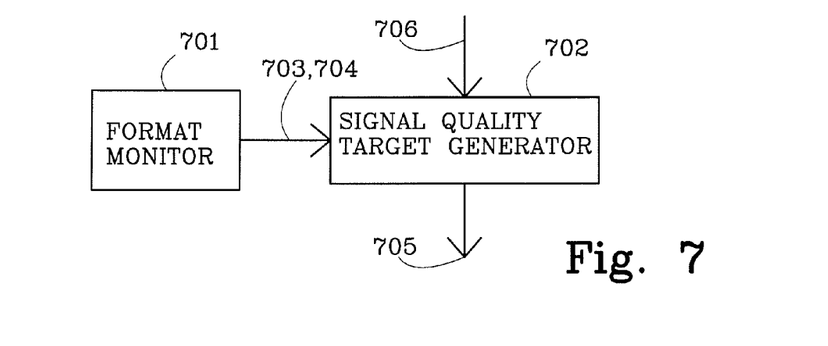
FIG. 7 is a block diagram illustrating a second exemplary embodiment of an apparatus according to the invention.

A second exemplary embodiment of the invention for use in the context of the radio communication system SYS1 of FIG. 1 is illustrated in FIG. 6 together with FIG. 7. FIGS. 6 and 7 illustrate processing and functional units respectively in a radio base station, e.g. the first radio base station RBS1, for detecting transmission format changes and updating a signal quality target, used for power control in the first radio base station RBS1, to include associated target offset components. By performing this processing in the first radio base station RBS1, it is possible to detect transmission format changes and provide associated updates of the signal quality target faster than when this processing is performed in the radio network controller RNC1.

However, for handling Soft handover scenarios, it is preferable to implement the invention in parallel also in the radio network controller RNC1 e.g. essentially according to the first exemplary embodiment disclosed in FIG. 3-5. Alternatively, it would also be possible to restrict updating of a signal quality target based on detected changes in transmission formats to single link radio transmission situations, i.e. when Soft Handover is not used. To avoid signal quality target steering conflicts between the radio network controller RNC1 and radio base stations, the radio network controller RNC1 could e.g. explicitly signal to the radio base stations when it has reacted to and included a target offset component in a signal quality target value (e.g. by providing a radio frame number and target offset to the radio base stations).

FIG. 7 schematically discloses a format monitor functional unit 701 connected to a signal quality target generator functional unit 702 representing a second exemplary embodiment of an apparatus according to the invention implemented in a radio base station such as the first radio base station RBS1 in FIG. 1.

FIG. 6 illustrates a second exemplary method according to the invention for updating a signal quality target value for power control of an ongoing radio transmission.

At step 601 the radio base station RBS1 monitors events associated with an ongoing 3GPP Enhanced Uplink transmission.

When an E-TFCI value has been decoded (an alternative E-TFCI) at step 601, a check is made at step 602 whether the transmission format of the 3GPP Enhanced Uplink transmission has changed. This step is performed by the format monitor 701 illustrated in FIG. 6 based on E-TFCI values decoded by the first radio base station RBS1. Thus, for the scenario illustrated FIG. 1 where the E-DCH transport channel 101 has been established between the mobile station MS1 and the first radio base station RBS1, the first radio base station RBS1 decodes E-TFCI values transmitted on the E-DPCCH channel 103.

If a newly received E-TFCI value matches the previously received E-TFCI value (an alternative NO at step 602), the processing returns to step 601 where the radio base station RBS1 waits for a new event.

If the newly received E-TFCI value differs from the previously received E-TFCI value (an alternative YES at step 602), the format monitor 701 informs the signal quality target generator 702 that there has been a change in transmission format providing both the old and new E-TFCI values (schematically illustrated as 703 and 704 respectively in FIG. 7) to the signal quality target generator 702. The format monitor 701 also internally registers the new E-TFCI value 704 as the most recently received E-TFCI value.

At step 603, the signal quality target generator 702 updates a signal quality target value 705 for power control of the concerned Enhanced Uplink transmission to include a target offset component associated with the detected transmission format change. This step can be performed in a similar way as step 302 in FIG. 3.

At step 604, the signal quality target generator 702 internally registers the target offset component, i.e. $D_{E\text{-}TFC\text{-}change}$, which was included in the signal quality target 705 as activated before processing returns to step 601 where the radio base station RBS1 waits for a new event.

When the first radio base station RBS1 receives an updated signal quality target value, referred to as a tentative signal quality target value 706 below, from the radio network controller RNC1 (an alternative UPDATE at step 601), a check is made by the signal quality generator 702 at step 605 whether there is an active target offset, i.e. whether a change in transmission format has been detected and as a result an associated target offset component has been included in the current signal quality target.

If there is no active target offset (an alternative NO at step 605, processing continues at step 606 where the signal quality generator 702 updates the signal quality target 705 by applying the tentative signal quality target value 706 received from the radio network controller RNC1 for power control of the 3GPP Enhanced Uplink transmission.

If there is an active target offset (an alternative YES at step 605), processing continues at step 607 where the signal quality target generator 702 checks whether the tentative signal quality target value received from the radio network controller RNC1 already includes the active target offset component. In this exemplary embodiment, this check is based on whether the signal from the radio network controller RNC1 conveying the tentative signal quality target value 706 also provides an indication that the tentative signal quality target already includes the active target offset. The OUTER LOOP POWER CONTROL frame of the Iub user plane protocol for DCH data streams could be modified to carry both the tentative signal quality target value and said indication whether the tentative signal quality target already includes the target offset.

If the active target offset is already included in the tentative signal quality target (an alternative YES at step 607), processing continues at step 608 where the signal quality target generator 702 marks the target offset as deactivated before updating, at step 606, the signal quality target 705 by applying the tentative signal quality target value 706 received from the radio network controller RNC1 for power control of the 3GPP Enhanced Uplink transmission If the active target offset is not included in the tentative signal quality target (an alternative NO at step 607), the signal quality target generator 702 updates the signal quality target 705 by combining the tentative signal quality target value 706 received from the radio network controller RNC1 with the active target offset component $D_{E\text{-}TFC\text{-}change}$ as expressed by equation (3)

$$SIR_{target}(k+1) = SIR_{tentative} + D_{E\text{-}TFC\text{-}change} \qquad (3)$$

where $SIR_{target}$ (k+1) is the new/updated signal quality target;

$SIR_{tentative}$ is the tentative signal quality target value received from the radio network controller; and $D_{E\text{-}TFC\text{-}change}$ is the active target offset.

In a third exemplary embodiment of the invention, the outer loop power control function is moved from the radio network controller RNC1 to the respective radio base station RBS1. In this exemplary embodiment, processing may be performed essentially as in the exemplary first embodiment (but in the radio base station instead of the radio network controller) using functional units as illustrated in FIG. 4.

It is of course possible to use other forms of signal quality target values/target offsets than SIR. Other examples include e.g. Signal to Interference and Noise Ratio (SINR), Eb/No (bit energy over noise), Ec/No (chip energy over noise). Further, please note that apart from equation (1), representing an example of a so called attack-decay filter, there are many alternative ways known in the art of how to adjust signal quality target values based on perceived communication quality, both in terms of what measure of perceived communication quality to use (e.g. number of transmission attempts for HARQ process, Block Error Rate BLER, Delay) and the way perceived communication quality is accounted for in signal quality target values e.g. using a Simple moving average filter (SMA), Double moving average filter (DMA), Simple exponential smoothing filter (SES), Double exponential smoothing filter (DES) or a Nonlinear exponential smoothing filter (NLES). From the perspective of the present invention, the way perceived communication quality is accounted for in a signal quality target is not important and different embodiments may use different ways of accounting for perceived communication quality.

The second exemplary embodiment is an example of embodiments of the invention where the inventive method is performed in a first control node (e.g. a radio base station) and wherein the first control node receives tentative signal quality target values from a second control node (e.g. a radio network controller) and wherein, upon detecting a change in transmission format, a tentative signal quality target value is combined with a target offset component associated with the detected change to produce an updated signal quality target. In such embodiments, it is preferable to avoid potential issues with the tentative signal quality target value already including the target offset associated with the detected change in transmission format. This can generally be done by defining a predetermined condition signifying that the target offset associated with the detected change in transmission format is likely to already be included in a tentative signal quality value received from the second node and then arranging the first control node to only combine the tentative signal quality value with the target offset associated with the detected change to produce a signal quality target value when said condition is not fulfilled.

The condition signifying that a tentative signal quality value already includes the target offset associated with the detected change could include at least one of the following:

the first node has received a signal from the second node indicating that the tentative signal quality target already includes said target offset component;

the period of time from detecting said change in transmission format until receiving the tentative quality target value exceeds a predetermined time period corresponding to the time required for the second control node to become aware of the change in transmission format, include said target offset component in the tentative signal quality target value and for the first control node to receive the tentative signal quality target value from the second control node.

In the first and second exemplary embodiments disclosed above, once a transmission format change is detected (steps 301 and 602), it triggers a signal quality target update by including a a target offset component associated with the detected change in an updated signal quality target value. In other embodiments, constraints could be applied so that the step of updating a signal quality target to include a target offset component associated with a detected change in transmission format, is selectively applied depending on the pattern of transmission formats recently applied for the radio transmission. Thus, the updating step could e.g. be applied if at least one of the following conditions are fulfilled:

the first transmission format has been used at least for a predefined period of time;

a group of transmission formats, including the first transmission format, have been used at least for a predefined period of time, wherein each transmission format in the group is associated with an estimated required signal quality and the difference between the estimated required signal qualities associated with any two transmission formats in the group is less than a predefined threshold;

the first transmission format has been used in at least a predefined percentage of time in a predefined period of time.

a group of transmission formats including the first transmission format have been used in at least a predefined percentage of time in a predefined period of time, wherein each transmission format in the group is associated with an estimated required signal quality and the difference between the estimated required signal qualities associated with any two transmission formats in the group is less than a predefined threshold.

the number of instances where said including step has been applied during a predefined period of time is less than a predefined number.

Figure 8:
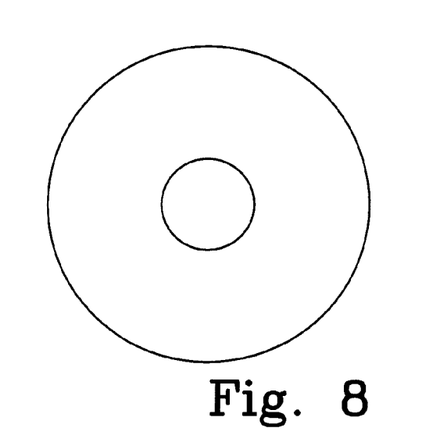
FIG. 8 shows an example of a computer-readable medium

The different embodiments of methods and apparatuses according to the invention disclosed above may all be implemented the same way as for the first exemplary embodiment, i.e. utilizing digital data processing circuitry in the form of one or more conventional programmable processors to perform the different processing steps of the methods. However, any digital data processing circuitry capable of performing said processing could be used, e.g. an ASIC, a discrete logic circuit etc. In the first exemplary embodiment of the invention, as in other embodiments of the invention using programmable devices, the controlling computer program (software) is embodied as machine-readable instructions stored on some kind of computer-readable medium such as RAM, a hard drive, electronic read-only memory, an optical storage device (e.g. a CD-ROM as schematically illustrated in FIG. 8) etc. Programmable devices performing processing according to the invention, can be dedicated to this task or used also for processing relating to other tasks.

Even though the invention in the exemplary embodiments disclosed above has been applied in the context of Enhanced Uplink of a UMTS radio communication system, the invention is also generally applicable in other contexts, both for transmissions in the uplink direction, i.e. for transmissions from mobile stations, as well as downlink direction, i.e. for transmissions to mobile stations, in UMTS radio communication systems or in other radio communication systems where radio transmissions are subject to power control utilizing signal quality targets and transmission formats of an ongoing radio transmission may change over time.

The invention claimed is:

1. A method of updating a signal quality target for power control of an ongoing uplink radio transmission in a radio communication system, said method comprising:
   detecting a change in transmission format from a first transmission format to a second transmission format for the uplink radio transmission;
   updating the signal quality target to include a target offset component associated with the detected change in transmission format; and
   determining said target offset component as a difference between an estimated required signal quality associated with the second transmission format and an estimated required signal quality associated with the first transmission format.

2. A method according to claim 1, where the uplink radio transmission is a 3GPP Enhanced Uplink transmission.

3. A method according to claim 2, where said detecting includes:
   detecting a change from a first Enhanced-Dedicated Channel Transport Format Combination Identifier (E-TFCI) value to a second E-TFCI value, where the first E-TFCI value is associated with the first transmission format and the second ETFCI value is associated with the second transmission format.

4. A method according to claim 1, where said signal quality target is a Signal to Interference target.

5. A method of updating a signal quality target for power control of an ongoing uplink radio transmission in a radio communication system, said method comprising:
   detecting a change in transmission format from a first transmission format to a second transmission format for the uplink radio transmission; and
   updating the signal quality target to include a target offset component associated with the detected change in transmission format,
   where said updating is selectively applied depending on a pattern of transmission formats recently applied for the ongoing uplink radio transmission.

6. A method according to claim 5, where said updating is selectively applied in response to at least one of the following conditions being fulfilled:
   the first transmission format has been used at least for a predefined period of time;
   a group of transmission formats, including the first transmission format, have been used at least for a predefined period of time, where each transmission format in the group is associated with an estimated required signal quality and a difference between estimated required signal qualities associated with any two transmission formats in the group is less than a predefined threshold;

the first transmission format has been used in at least a predefined percentage of time in a predefined period of time;

a group of transmission formats, including the first transmission format, have been used in at least a predefined percentage of time in a predefined period of time, where each transmission format in the group is associated with an estimated required signal quality and a difference between estimated required signal qualities associated with any two transmission formats in the group is less than a predefined threshold; and a number of instances where said updating has been applied during a predefined period of time is less than a predefined number.

7. A method of updating a signal quality target for power control of an ongoing uplink radio transmission in a radio communication system, said method comprising:

detecting a change in transmission format from a first transmission format to a second transmission format for the uplink radio transmission; and updating the signal quality target to include a target offset component associated with the detected change in transmission format, where the method is performed in a first control node, and where said updating involves combining a tentative signal quality target value received from a second control node with said target offset component to update said signal quality target.

8. A method according to claim 7, where said updating is performed only if a predetermined condition, signifying that the tentative signal quality target value is likely to already include said target offset component, is not fulfilled.

9. A method according to claim 8, where the predetermined condition includes at least one of the following:

the first control node has received a signal from the second control node indicating that the tentative signal quality target value already includes said target offset said target offset component in the tentative signal quality target value and for the first control node to receive the tentative signal quality target value from the second control node.

10. An apparatus adapted to update a signal quality target for power control of an uplink radio transmission in a radio communication system, said apparatus comprising:

means for detecting a change in transmission format from a first transmission format to a second transmission format for the uplink radio transmission; and means for updating the signal quality target to include a signal quality target offset component associated with the detected change in transmission format, where the signal quality target offset component associated with the detected change is determined as a difference between an estimated required signal quality associated with the second transmission format and an estimated required signal quality associated with the first transmission format.

11. An apparatus according to claim 10, where the uplink radio transmission is a 3GPP Enhanced Uplink transmission.

12. An apparatus according to claim 11, where the means for detecting a change in transmission format includes:

means for detecting a change from a first Enhanced-Dedicated Channel Transport Format Combination Identifier (E-TFCI) value associated with the first transmission format to a second E-TFCI value associated with the second transmission format.

13. An apparatus according to claim 10, where the apparatus is a radio base station.

14. An apparatus according to claim 11, where the apparatus is a radio network controller.

15. An apparatus adapted to update a signal quality target for power control of an uplink radio transmission in a radio communication system, said apparatus comprising:

means for detecting a change in transmission format from a first transmission format to a second transmission format for the uplink radio transmission; and means for updating the signal quality target to include a signal quality target offset component associated with the detected change in transmission format, where the means for updating the signal quality target includes:

means for selectively updating the signal quality target to include the signal quality target offset component depending on a pattern of transmission formats recently applied for the ongoing uplink radio transmission.

16. An apparatus according to claim 15, where the signal quality target is updated to include the signal quality target offset component in response to at least one of the following conditions being fulfilled:

the first transmission format has been used at least for a predefined period of time;

a group of transmission formats, including the first transmission format, have been used at least for a predefined period of time, where each transmission format in the group is associated with an estimated required signal quality and a difference between estimated required signal qualities associated with any two transmission formats in the group is less than a predefined threshold;

the first transmission format has been used in at least a predefined percentage of time in a predefined period of time;

a group of transmission formats including the first transmission format have been used in at least a predefined percentage of time in a predefined period of time, where each transmission format in the group is associated with an estimated required signal quality and a difference between estimated required signal qualities associated with any two transmission formats in the group is less than a predefined threshold; and a number of instances where said updating has been applied during a predefined period of time is less than a predefined number.

17. An apparatus adapted to update a signal quality target for power control of an uplink radio transmission in a radio communication system, said apparatus comprising:

means for detecting a change in transmission format from a first transmission format to a second transmission format for the uplink radio transmission; and means for updating the signal quality target to include a signal quality target offset component associated with the detected change in transmission format, where the apparatus acts as a first control node in the radio communication system, and where said means for updating the signal quality target includes:

means for combining a tentative signal quality control target value, received from a second control node in the radio communication system, with said target offset component to update said signal quality target.

18. An apparatus according to claim 17, where said means for updating the signal quality target includes:

means for combining the tentative signal quality control target value with said target offset component to update said signal quality target only if a predetermined condition, signifying that the tentative signal quality target value is likely to already include said target offset component, is not fulfilled.

19. A computer program product embodied on a non-transitory computer-readable medium and executable by digital data processing circuitry to perform a method that comprises:

detecting a change in transmission format from a first transmission format to a second transmission format for the uplink radio transmission;

updating the signal quality target to include a target offset component associated with the detected change in transmission format; and determining said target offset component as a difference between an estimated required signal quality associated with the second transmission format and an estimated required signal quality associated with the first transmission format.

* * * * *

UNITED STATES PATENT AND TRADEMARK OFFICE
CERTIFICATE OF CORRECTION

| | | |
|---|---|---|
| PATENT NO. | : 8,396,503 B2 | Page 1 of 2 |
| APPLICATION NO. | : 12/679622 | |
| DATED | : March 12, 2013 | |
| INVENTOR(S) | : Larsson et al. | |

It is certified that error appears in the above-identified patent and that said Letters Patent is hereby corrected as shown below:

On the Title Page, in Item [75], under "Inventors", in Column 1, Line 1, delete "Lulea" and insert -- Luleå --, therefor.

On the Title Page, in item [75], under "Inventors", in Column 1, Line 2, delete "Okvist, Lulea" and insert -- Ökvist, Luleå --, therefor.

In the Specification

Column 1, Line 21, delete "Telecommunications (UMTS)" and insert -- Telecommunications System (UMTS) --, therefor.

Column 1, Line 34, delete "Data" and insert -- Dedicated --, therefor.

Column 2, Line 34, delete "medium" and insert -- medium. --, therefor.

Column 2, Lines 49-52, delete "General Packet.......services." and insert the same at Line 48, after "and a" as a continuation of the paragraph.

Column 2, Line 50, delete "node" and insert -- Node --, therefor.

Column 2, Line 54, delete "the the" and insert -- the --, therefor.

Column 2, Line 55, delete "mu" and insert -- Iu --, therefor.

Column 3, Line 4, delete "FIG. 1" and insert -- FIG. 1. --, therefor.

Column 3, Lines 33-34, delete "multi-plexing/demultiplexing" and insert -- multiplexing/demultiplexing --, therefor.

Signed and Sealed this
Twenty-fifth Day of February, 2014

Michelle K. Lee
*Deputy Director of the United States Patent and Trademark Office*

CERTIFICATE OF CORRECTION (continued)
U.S. Pat. No. 8,396,503 B2

Column 4, Line 40, delete "Transport Format Indicator" and insert -- Transport Format Combination Indicator --, therefor.

Column 5, Line 22, delete "an Hybrid" and insert -- a Hybrid --, therefor.

Column 7, Lines 6-8, delete "E-TFCI value........step 301." and insert the same at Line 5, after "received" as a continuation of the paragraph.

Column 9, Line 30, delete "signal quality target value 705" and insert -- signal quality target 705 --, therefor.

Column 9, Line 45, delete "signal quality generator 702" and insert -- signal quality target generator 702 --, therefor.

Column 9, Lines 51-52, delete "signal quality generator 702" and insert -- signal quality target generator 702 --, therefor.

Column 10, Line 11, delete "transmission" and insert -- transmission. --, therefor.

Column 11, Line 24, delete "a target" and insert -- target --, therefor.

Column 11, Line 43, delete "time." and insert -- time; --, therefor.

Column 11, Line 51, delete "threshold." and insert -- Threshold; --, therefor.

In the Claims

Column 12, Line 40, in Claim 3, delete "ETFCI" and insert -- E-TFCI --, therefor.

Column 13, Lines 37-38, in Claim 9, delete "said target offset said target offset" and insert -- said target offset --, therefor.

Column 14, Line 1, in Claim 14, delete "claim 11," and insert -- claim 10, --, therefor.